(12) United States Patent
O'Neill et al.

(10) Patent No.: US 9,755,250 B2
(45) Date of Patent: Sep. 5, 2017

(54) METHOD OF MAKING A FUEL CELL COMPONENT HAVING AN INTERDIGITATED FLOW FIELD CONFIGURATION

(71) Applicant: Audi AG, Ingolstadt (DE)

(72) Inventors: Jonathan Daniel O'Neill, Manchester, CT (US); Roopnarine Sukhram, Hartford, CT (US); Glenn Michael Allen, Vernon, CT (US); Christopher John Carnevale, Vernon, CT (US)

(73) Assignee: Audi AG, Ingolstadt (DE)

( * ) Notice: Subject to any disclaimer, the term of this patent is extended or adjusted under 35 U.S.C. 154(b) by 138 days.

(21) Appl. No.: 13/950,630

(22) Filed: Jul. 25, 2013

(65) Prior Publication Data

US 2015/0030964 A1    Jan. 29, 2015

(51) Int. Cl.
  *H01M 8/0258*    (2016.01)
(52) U.S. Cl.
  CPC ........... *H01M 8/0258* (2013.01); *Y02P 70/56* (2015.11)
(58) Field of Classification Search
  CPC .. H01M 8/002; H01M 8/006; H01M 8/04746; H01M 8/04
  See application file for complete search history.

(56) References Cited

U.S. PATENT DOCUMENTS

| | | | |
|---|---|---|---|
| 4,988,583 A * | 1/1991 | Watkins et al. | 429/492 |
| 6,830,736 B1 * | 12/2004 | Lamla | B01J 12/007 165/167 |
| 2002/0086200 A1 * | 7/2002 | Margiott | 429/38 |
| 2005/0191541 A1 * | 9/2005 | Gurau | H01M 8/0258 429/414 |
| 2007/0037033 A1 * | 2/2007 | Chiba | H01M 8/0206 429/434 |
| 2009/0098435 A1 * | 4/2009 | Shibata et al. | 429/32 |
| 2011/0111283 A1 * | 5/2011 | Rust, III | H01M 4/0428 429/163 |
| 2012/0288784 A1 * | 11/2012 | Victor | H01M 8/0213 429/512 |

(Continued)

OTHER PUBLICATIONS

"Stamping". Merriam-Webster Online Dictionary. Web. Accessed on: Sep. 21, 2015.*

*Primary Examiner* — Sarah A Slifka
*Assistant Examiner* — Brian OHara
(74) *Attorney, Agent, or Firm* — Seed IP Law Group LLP

(57) ABSTRACT

According to an illustrative embodiment, a method of making a fuel cell component includes removing material from a first plurality of locations along at least one surface on a plate to simultaneously establish a plurality of first channels on the surface. Each first channel has a length between a first end near a first edge of the surface and a second end spaced from a second, opposite edge of the surface. Material is also removed from a second plurality of locations along the surface to simultaneously establish a plurality of second channels on the surface. Each second channel has a length beginning at a first end spaced from the first edge and a second end near the second edge. Material is also removed from the surface near the first ends of at least some of the first channels to simultaneously establish an inlet portion for directing a fluid into the corresponding first channels.

8 Claims, 3 Drawing Sheets

(56) References Cited

U.S. PATENT DOCUMENTS

2013/0323623 A1* 12/2013 O'Neill ............... H01M 8/0265
429/514
2014/0093812 A1* 4/2014 Madden .............. H01M 8/1004
429/508

* cited by examiner

METHOD OF MAKING A FUEL CELL COMPONENT HAVING AN INTERDIGITATED FLOW FIELD CONFIGURATION

This invention was made with government support under Contract No. CA-04-7003-00 awarded by the Department of Transportation. The Government therefore has certain rights in this invention

BACKGROUND

Fuel cells are useful for generating electricity based upon an electrochemical reaction. Various fuel cell components are involved in facilitating the electrochemical reaction. For example, flow fields are established within a fuel cell for carrying the reactants involved in the electrochemical reaction. A variety of flow field configurations have been proposed.

Some flow field configurations are interdigitated. In such configurations, every other flow channel is situated different than the one immediately adjacent to it. Some of the channels begin at one edge of a plate, for example, while others begin slightly inward of that edge. The channels that begin at that edge terminate prior to an opposite edge while the others extend to the opposite edge. Such flow field configurations are known and may be useful for facilitating movement of the reactants between adjacent channels and across a gas diffusion layer. Such reactant movement tends to force the reactant closer to the catalyst layer for facilitating the electrochemical reaction.

While such flow fields may be useful, they also present challenges. For example, if the design of the channels near the inlet to the channels is not appropriately configured, that may reduce the amount of humidity in the corresponding region of the fuel cell. It is useful to maintain a desired level of humidity to avoid dry out. Manufacturing an interdigitated flow field with a configuration that facilitates a sufficient humidity level may be difficult to achieve in an economical manner.

SUMMARY

According to an illustrative embodiment, a method of making a fuel cell component includes removing material from a first plurality of locations along at least one surface on a plate to simultaneously establish a plurality of first channels on the surface. Each first channel has a length between a first end near a first edge of the surface and a second end spaced from a second, opposite edge of the surface. Material is also removed from a second plurality of locations along the surface to simultaneously establish a plurality of second channels on the surface. Each second channel has a length beginning at a first end spaced from the first edge and a second end near the second edge. Material is also removed from the surface near the first ends of at least some of the first channels to simultaneously establish an inlet portion for directing a fluid into the corresponding first channels.

The various features and advantages of disclosed example embodiments will become apparent to those skilled in the art from the following detailed description. The drawings that accompany the detailed description can be briefly described as follows.

DETAILED DESCRIPTION

Figure 1:
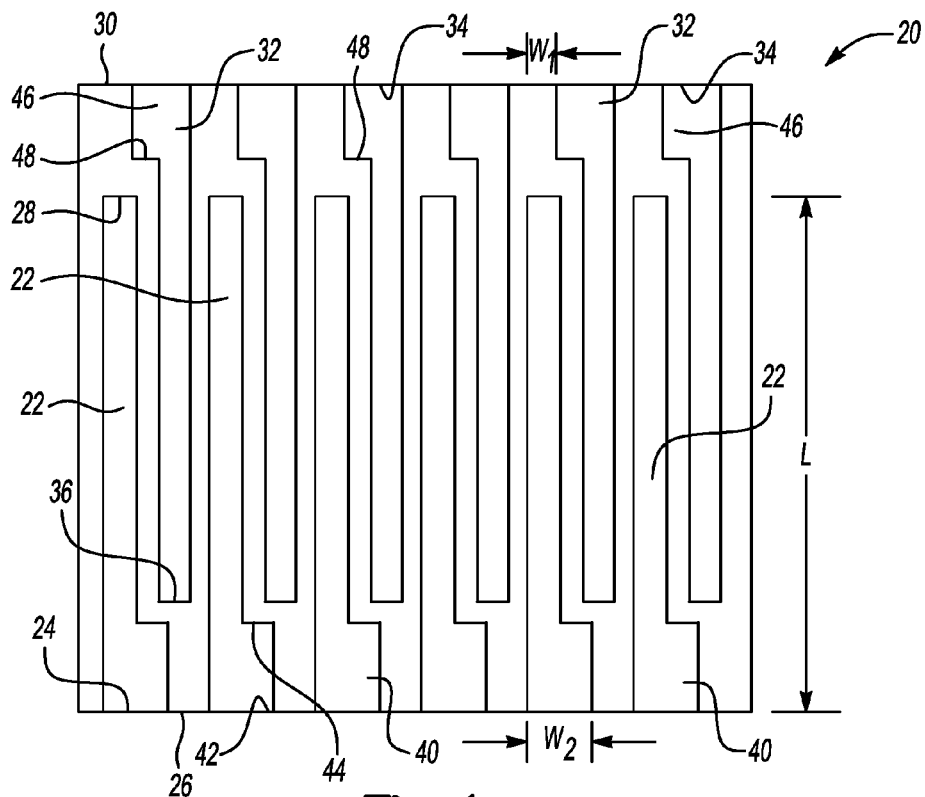
FIG. 1 schematically illustrates an example flow field configuration on an example fuel cell component.

FIG. 1 schematically shows a fuel cell component 20, such as a flow field plate. A plurality of first channels 22 have a first end 24 near a first edge 26 of the surface on which the channels 22 are formed. In the illustrated example, the first end 24 is at the edge 26. The first channels 22 have a length L extending between the first end 24 and a second end 28. As can be appreciated from the illustration, the second ends 28 are spaced from a second edge 30, which is opposite from the first edge 26. The first channels 22 do not extend along the entire surface of the plate but, instead, terminate at a location spaced from the edge 30.

The example of FIG. 1 includes a plurality of second channels 32. The illustrated arrangement is an interdigitated flow field arrangement because every other channel is a first channel or second channel, respectively. In other words, there is a second channel 32 between a first channel 22 and the next closest or adjacent first channel 22. In this example, there is at least one first channel 22 between each second channel 32 and the next adjacent second channel 32 and vice versa.

As can be appreciated from the illustration, the second channels 32 have a length similar to the length of the first channels 22. In this example, the second channels 32 extend from a first end 34 near the edge 30 to a second end 36 that is spaced from the first edge 26. In the illustrated example, the first ends 34 are situated on the edge 30.

A plurality of inlet portions 40 are associated with the first channels 22. In this example, the inlet portions 40 extend between a first end 42 that is at the edge 26 of the plate. A second end 44 of the inlet portions 40 is situated at a location between the second ends 36 of the second channels 32 and the first edge 26 of the surface on which the channels are formed. In this example, the inlet portions 40 are parallel to corresponding sections of the first channels 22. There is essentially no barrier between the inlet portions 40 and the first channels 22 in this example. In other words, the inlet portions 40 are merged with the corresponding first channels 22 along the section of the first channel that is coextensive with the length of the inlet portion 40.

The inlet portions 40 are not the only inlet to the first channels 22. The first ends 24 are an inlet to the first channels 22, also. The inlet portions 40 facilitate a desired level of humidity along an inlet region of the example flow field plate. The inlet portions 40 effectively slow down the flow of a reactant such as air through the first channels 22 in the inlet region of the flow field. Slower air movement allows for more humidification along the inlet region, which is useful, for example, to avoid membrane dry out.

The example of FIG. 1 includes outlet portions 46 associated with the second channels 32. In this example, the outlet portions 46 extend between the second edge 30 and ends 48 of the outlet portions 46. The outlet portions 46 are situated parallel to the second channels 32. There is essentially no barrier between the second channels 32 and their associated outlet portions 46 along the length of the outlet portions 46. The outlet portions 46 provide symmetry on the example fuel cell component 20. Such symmetry is useful, for example, to reduce potential operator error when assembling a fuel cell. The outlet portions 46 may also provide advantages for maintaining desired flow characteristics of a reactant moving through or along the flow field established by the first channels 22 and the second channels 32.

Figure 2:
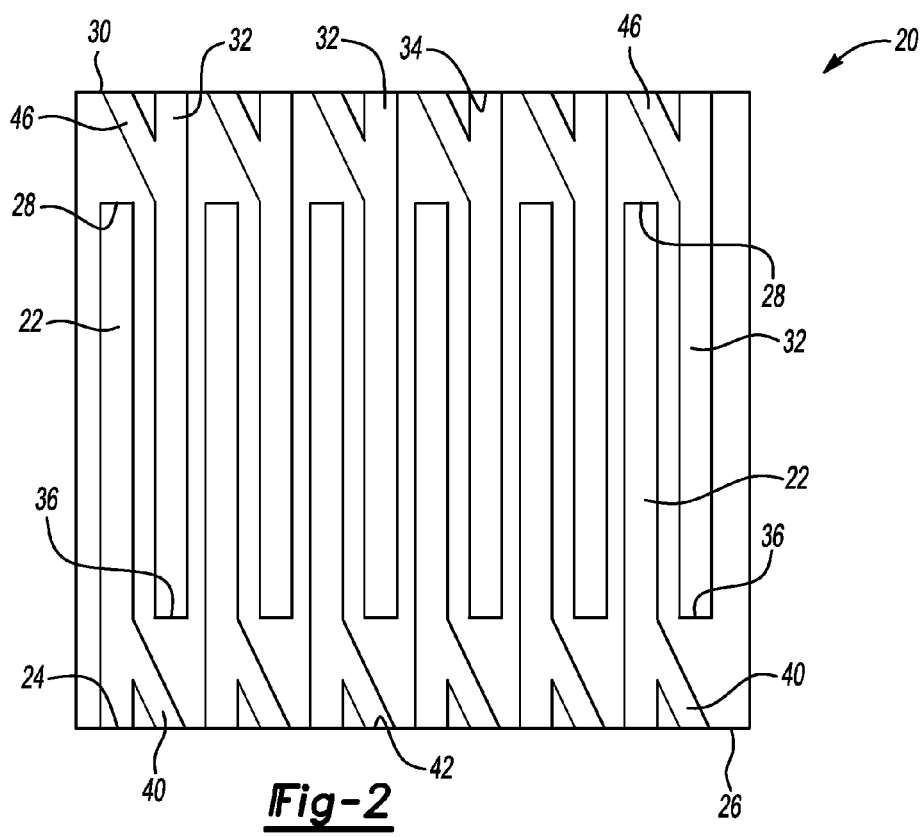
FIG. 2 schematically illustrates another example flow field configuration.

FIG. 2 schematically illustrates another example configuration of an interdigitated flow field including first channels 22 and second channels 32. In this example, the inlet portions 40 and the outlet portions 46 are oriented at an oblique angle relative to the length of the first channels 22 and second channels 32. The inlet portions 40 in this example have a first end 42 situated at the first edge 26 and a second end that merges with a corresponding first channel 22. Similarly, the outlet portions 46 merge with a corresponding second channel 32 and end at the second edge 30. The inlet portions 40 and outlet portions 46 of the example of FIG. 2 have the same functional characteristics as those in the example of FIG. 1.

Manufacturing a flow field of the type shown in the examples of FIGS. 1 and 2 can be challenging from an economic perspective. Given the necessity for having a desired level of humidification and corresponding reactant flow characteristics, it has previously been thought necessary to use an end milling technique in which each channel (with its associated inlet or outlet portion) is individually established for the flow field. While this approach may provide a useful flow field configuration, it introduces inefficiencies during the manufacturing process, which tend to increase the cost associated with a fuel cell component having such an interdigitated flow field. Utilizing a method of making a fuel cell component consistent with the techniques of this description provides efficiencies and associated cost savings, in part, because it allows for multiple channels to be established simultaneously. By reducing the time and complexity associated with the manufacturing process, one of the challenges facing fuel cell manufacturers can be more effectively addressed. Fuel cell manufacturers are constantly striving to find ways to make fuel cells less expensive. The techniques explained in this description address that need.

Figure 3A:
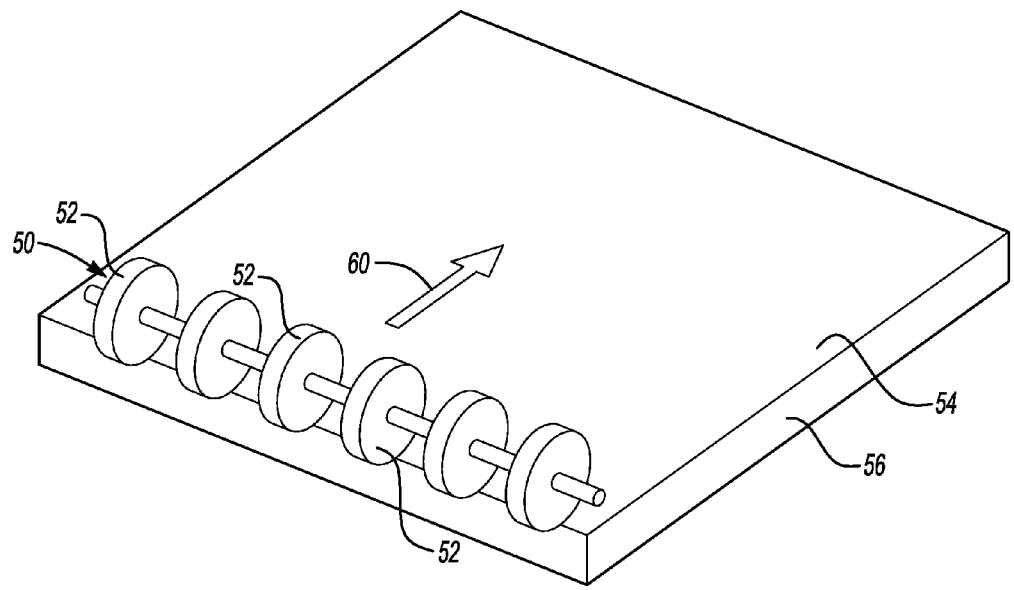
FIGS. 3A-3C schematically illustrate a process of making a fuel cell component having a flow field configuration like that shown in FIG. 1 or 2.

FIG. 3A schematically illustrates a portion of an example technique of making a fuel cell component. A cutting tool 50 includes a plurality of cutting members 52 for removing material from a surface 54 on a plate 56. In one example, the cutting tool 50 comprises a gang mill.

The cutting tool 50 simultaneously establishes the plurality of first channels 22 as a result of relative movement between the cutting tool 50 and the plate 54 as schematically shown by the arrow 60. In one example, a single pass of the cutting tool 50 across the surface 54 establishes the first channels 22.

Figure 3B:
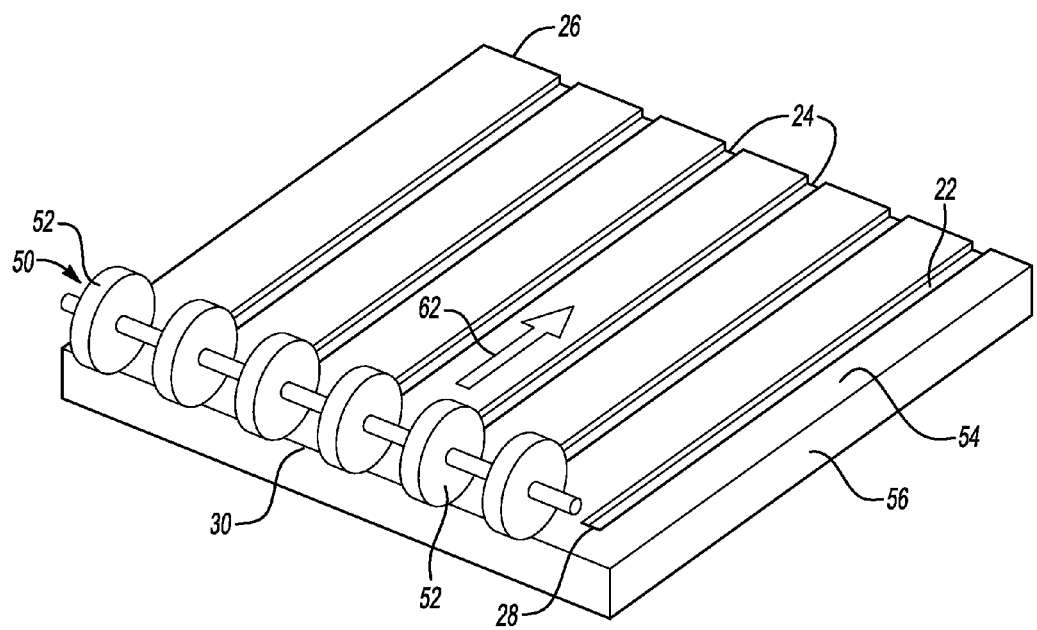

FIG. 3B schematically shows a later portion of the example method of making a fuel cell component. As shown in FIG. 3B, the first channels 22 have already been established by the cutting tool 50. The plate 56 and the cutting tool 50 are reoriented relative to each other such that the cutting tool 50 is situated in FIG. 3B to remove additional material from different locations on the surface 54 for establishing the second channels 32. Relative movement between the plate 54 and the cutting tool 50 as schematically shown by the arrow 62 facilitates simultaneously establishing the second channels 32. In one example, a single pass of the cutting tool 50 across a portion of the surface 54 of the plate 56 results in establishment of the second channels 32.

Figure 3C:
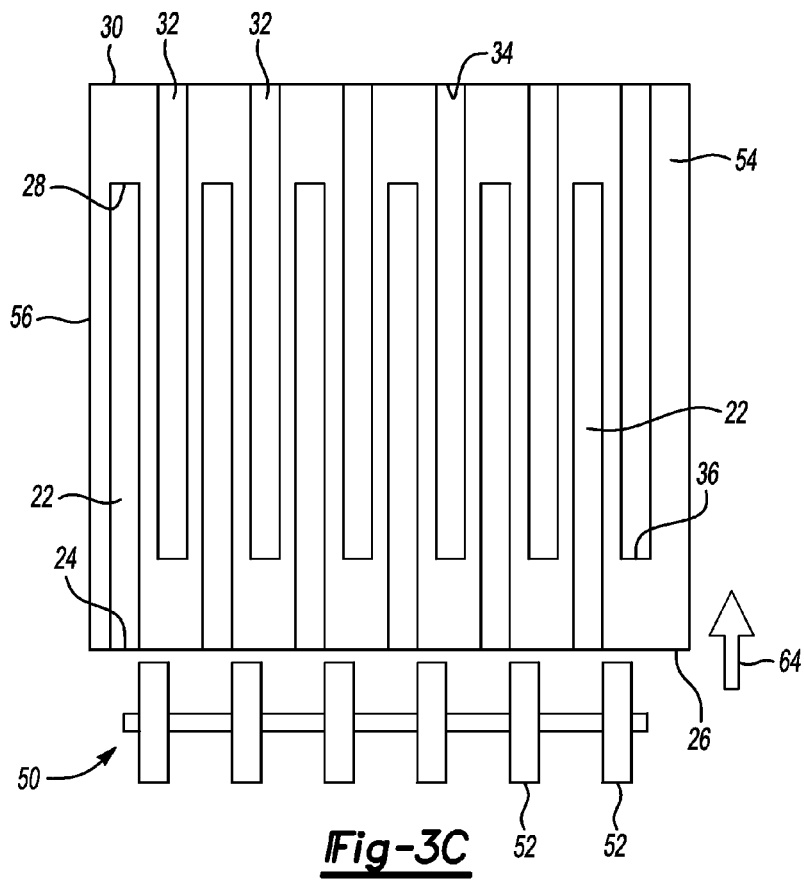

FIG. 3C shows the configuration after performing the steps schematically represented in FIGS. 3A and 3B. At the stage illustrated in FIG. 3C, the first channels 22 and second channels 32 have already been established on the surface 54 of the plate 56. In FIG. 3C, the cutting tool 50 is situated for establishing the inlet portions 40. Relative movement between the plate 56 and the cutting tool 50 as schematically shown by the arrow 64 facilitates establishing the inlet portions 40.

Figure 4:
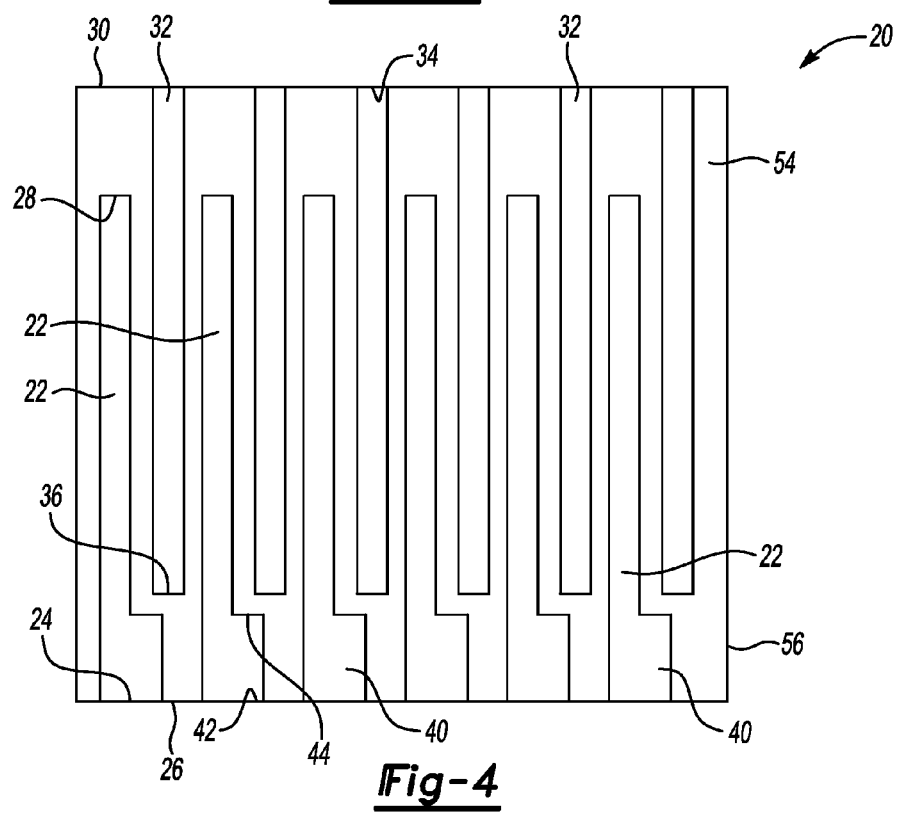
FIG. 4 schematically illustrates a fuel cell component during a stage of the process represented by FIGS. 3A-3C.

After the portion of the process schematically represented by FIG. 3C has been performed the resulting configuration is as shown in FIG. 4. At this stage, the first channels 22, second channels 32 and inlet portions 40 have been established on the surface 54 of the plate 56. Reorienting the plate 54 and the cutting tool 50 relative to each other and performing a step similar to that schematically represented by FIG. 3C near the second edge 30 facilitates establishing the outlet portions 46.

For purposes of establishing a configuration of a flow field like that shown in FIG. 2, the orientation shown in FIG. 3C would be altered so that the cutting tool 50 establishes the inlet portions 40 at an oblique angle rather than in a direction parallel to the length of the first channels 22.

The illustrated example technique facilitates more quickly and economically establishing an interdigitated flow field for a fuel cell component. Simultaneously establishing a plurality of first channels and simultaneously establishing a plurality of second channels on a surface of a plate reduces the amount of time necessary for making such a component and, therefore, reduces cost. Additionally, the ability to simultaneously establish a plurality of inlet portions and outlet portions allows for economically realizing a flow field configuration that facilitates a desired amount of humidification within a fuel cell.

The preceding description is illustrative rather than limiting in nature. Variations and modifications to the disclosed examples may become apparent to those skilled in the art that do not necessarily depart from the essence of the contribution to the art provided by the disclosed examples. The scope of legal protection provided to the invention can only be determined by studying the following claims.

We claim:
1. A method of making a fuel cell component, comprising:
removing material from a plate at a first plurality of locations on a surface of the plate to simultaneously form a plurality of first channels in the surface, each first channel having a first length extending from a first end of the first channel at a first edge of the surface to a second end of the first channel spaced apart from a second edge of the surface opposite to the first edge of the surface, each of the first channels having a first width;
removing material from the plate at a second plurality of locations on the surface to simultaneously form a plurality of second channels in the surface, each second channel having a second length extending from a first end of the second channel spaced apart from the first edge to a second end of the second channel at the second edge; and
removing material from the plate at the surface near the first ends of the first channels to simultaneously form a plurality of inlet portions that are immediately adjacent to and merged with respective sections of the first lengths of the first channels and which are useful for directing fluid into the first channels, each of the inlet portions having a second width, the inlet portions extending to the first edge of the surface of the plate, the inlet portions being fluidically isolated from one another between the first and second edges of the plate, and each of the sections of the first lengths of the first channels having a width that is a sum of the first width and the second width.

2. The method of claim 1, further comprising removing material from the surface near the second ends of the second channels to simultaneously form a plurality of outlet portions useful for carrying fluid out of the second channels, the outlet portions extending to the second edge of the surface of the plate, and the outlet portions being fluidically isolated from one another between the first and second edges of the plate.

3. The method of claim 2, wherein each first channel has an associated inlet portion and each second channel has an associated outlet portion.

4. The method of claim 1, wherein each inlet portion merges with a respective first channel at a location between the first edge and the first ends of the second channels.

5. The method of claim 1, wherein the first channels are interdigitated with the second channels.

6. The method of claim 1, wherein the inlet portions are at least partially oriented at an oblique angle relative to the length of the first channels.

7. The method of claim 1, wherein the inlet portions are at least partially oriented parallel to the length of the first channels.

8. The method of claim 1, wherein the inlet portions establish an increased flow capacity for carrying fluid along a section of the first channels near a location where a fluid is introduced into the first channels.

* * * * *